(12) United States Patent
Ahmed et al.

(10) Patent No.: US 7,676,090 B2
(45) Date of Patent: Mar. 9, 2010

(54) SYSTEMS AND METHODS FOR CONTENT-BASED DOCUMENT IMAGE ENHANCEMENT

(75) Inventors: Mohamed N. Ahmed, Louisville, KY (US); Brian E. Cooper, Lexington, KY (US); Michael E. Lhamon, Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 858 days.

(21) Appl. No.: 11/421,881

(22) Filed: Jun. 2, 2006

(65) Prior Publication Data

US 2006/0280366 A1 Dec. 14, 2006

Related U.S. Application Data

(63) Continuation of application No. 10/224,660, filed on Aug. 22, 2002, now Pat. No. 7,079,686.

(51) Int. Cl.
*G06K 9/34* (2006.01)
*G06K 9/72* (2006.01)
(52) U.S. Cl. ............... 382/176; 382/180; 382/229; 358/462
(58) Field of Classification Search ............... 382/173, 382/176, 177, 199, 180, 190, 192, 194, 195, 382/197, 229; 358/462
See application file for complete search history.

(56) References Cited

U.S. PATENT DOCUMENTS

| | | | | |
|---|---|---|---|---|
| 4,411,015 A | * | 10/1983 | Scherl et al. | 382/171 |
| 4,503,556 A | * | 3/1985 | Scherl et al. | 382/176 |
| 4,577,235 A | * | 3/1986 | Kannapell et al. | 358/462 |
| 5,379,130 A | * | 1/1995 | Wang et al. | 358/462 |
| 5,956,468 A | * | 9/1999 | Ancin | 358/1.9 |
| 5,995,659 A | * | 11/1999 | Chakraborty et al. | 382/176 |
| 6,266,439 B1 | * | 7/2001 | Pollard et al. | 382/164 |
| 6,289,122 B1 | * | 9/2001 | Karidi | 382/176 |
| 6,301,386 B1 | * | 10/2001 | Zhu et al. | 382/176 |
| 6,470,095 B2 | * | 10/2002 | Mahoney et al. | 382/199 |
| 6,587,115 B2 | * | 7/2003 | Gong et al. | 345/596 |

* cited by examiner

*Primary Examiner*—Manav Seth (57) ABSTRACT

A system can include a system processor that is programmed or adapted to classify pixels in a document image, and in some instances, to enhance the document image based upon such classification. Image data including pixels is received. For each pixel in some subset of the image data, a feature vector is generated. Each pixel in the subset is classified as text or image based upon its associated feature vector. The classifications can be outputted for storage and/or further processing. Further processing can include pixel level enhancement processing. Such enhancement processing can include application of a sharpening filter to pixels classified as text and of a smoothing filter to pixels classified as image. In some instances, background suppression can be performed upon a subset of the image data prior to classification.

15 Claims, 5 Drawing Sheets

SYSTEMS AND METHODS FOR CONTENT-BASED DOCUMENT IMAGE ENHANCEMENT

BACKGROUND

This patent application is a continuation of the U.S. patent application Ser. No. 10/224,660, filed Aug. 20, 2002, entitled "Systems and Methods for Content-Based Document Image Enhancement" and assigned to the assignee of the present application.

The present invention is directed to systems and methods for enhancing images of documents. More specifically, without limitation, the present invention relates to systems and methods for enhancing images of documents based upon the content of such documents.

Digital copying, in which a digital image is obtained from a scanning device and then printed, involves a variety of inherent factors that compromise image quality. Ordered halftone patterns in the original document interact with the periodic sampling of the scanner, producing objectionable moiré patterns. These are exacerbated when the copy is reprinted with an ordered halftone pattern. In addition, limited scan resolution blurs edges, degrading the appearance of detail such as text. Fine detail also suffers from flare, caused by the reflection and scattering of light from the scanner's illumination source. Flare blends together nearby colors, blurring the high-frequency content of the document.

To suppress moiré, a filter may be constructed that is customized to the frequencies of interest. However, both the detection of the input halftone frequencies and the frequency-domain filtering itself can require significant computational effort. Although crude, a simple, small low-pass filter can correct the majority of moiré artifacts. Unfortunately, low-pass filtering affects detail as well, blurring it even further. Sharpening improves the appearance of text and fine detail, countering the effects of limited scan resolution and flare. Edges become clear and distinct. Of course, other artifacts such as noise and moiré become sharper as well.

The solution is simple in concept: determine the content of regions within the scanned image and then apply the appropriate filter to each region. Sharpening should be performed on fine detail, while moiré suppression should be applied to certain periodic artifacts. From the above discussion, therefore, for an image enhancement system to work properly, a preprocessing step should include the segmentation of the document into text and halftoned images, as well as identification of background. If this step is successfully completed, selection and/or application of appropriate additional processing such as filtering, interpolation, optical character recognition or transformation can occur.

Several techniques have been used to segment documents into text, images and background. These techniques have been primarily designed for optical character recognition (OCR). In these techniques, generally, the document is divided into columns. The columns are then separated into rectangular connected regions. Regions that are small are considered to be text, while large regions are treated as images. These techniques, however, require large portions of the document to be saved in memory and also require intensive computations, which render them impractical for real-time processing.

For enhancement purposes, a simpler and faster way to differentiate between text and image regions in scanned documents is to extract edge information. In general, a higher magnitude of edges would suggest high contrast between a pixel and its neighbors. This is usually an indication of the presence of a text element. Using a predefined threshold, a simple classifier can be constructed:

1. If edge values are higher than a certain threshold then pixels are classified as text; otherwise they are classified as images.
2. Text pixels are sharpened while image pixels are smoothed.

This technique, however, has several disadvantages. First, the algorithm, although simple, does not meet real-time computational constraints. Next, selecting an edge threshold low enough to sharpen all text will sharpen other features as well (resulting from misclassifying images as text), Finally, increasing the value of the threshold will cause parts of the text (especially fine strokes) to be misclassified and potentially blurred.

These and other disadvantages of known techniques are solved in one embodiment of the present invention by including spatial constraints with the edge information. Edge thresholds are set high enough to ensure smooth images, and spatial information ensures that fine text is sharpened. The output of this operation significantly improves the quality of the scanned document.

SUMMARY

In one embodiment, the present invention is directed to systems and methods for enhancing images of documents. One exemplary embodiment according to the present invention includes a system processor that receives image data associated with a document and enhances it. Some embodiments can include a system data store (SDS) that may store the received image data, the enhanced image data and/or both.

The SDS may include multiple physical and/or logical data stores for storing the various types of information used. Data storage and retrieval functionality may be provided by either the system processor or data storage processors associated with the data store. The system processor is in communication with the SDS via any suitable communication channel(s). The system processor may include one or more processing elements that provide analysis, enhancement and/or other functionality.

Accordingly, one exemplary method of document image enhancement includes a variety of steps that may, in certain embodiments, be executed by the environment summarized above and more fully described below or be stored as computer executable instructions in and/or on any suitable combination of computer-readable media. In accordance with one exemplary embodiment of the present invention, image data associated with a document containing text and/or image components is received. Feature vectors associated with one or more pixels in the received image data are generated. Each pixel is then classified as text or image based upon the feature vectors associated with it. During classification, spatial distance between a pixel classified as text based upon its feature vector and a pixel previously classified as text are used to refine the classification. The classifications can then be outputted.

The destination for the outputted classifications can vary in different embodiments. For instance, some embodiments output the classifications to an SDS for storage along with the image data. The stored classifications can then be used by other systems as appropriate. In some embodiments, the output classifications can feed directly into further processing. Such further processing can include, alone or in combination, one or more transformations, application of filters or other pixel level image processing technique known to those skilled in the art.

Some embodiment may further include a background suppression step prior to classification. In one exemplary embodiment, the background of an image is suppressed as follows. A determination is made as to whether a given pixel is a background pixel based upon its intensity value. If the given pixel is determined to be background, the intensity value is set to a terminal intensity value, typically representing either white or black. If the given pixel is not determined to be background, the intensity value is mapped into a replacement intensity value according to a specified mapping function. Alternatively, other background suppression techniques may be employed as further detailed below.

Additional advantages of certain embodiments of the invention will be set forth in part in the description which follows, and in part will be obvious from the description, or may be learned by practice of the invention. The advantages of certain embodiments of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate embodiments of the invention and together with the description, serve to explain the principles of the present invention.

DETAILED DESCRIPTION

Exemplary embodiments of the present invention are now described in detail. Referring to the drawings, like numbers indicate like parts throughout the views. As used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. Finally, as used in the description herein and throughout the claims that follow, the meanings of "and" and "or" include both the conjunctive and disjunctive and may be used interchangeably unless the context clearly dictates otherwise.

Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

As used herein, the classification of a pixel as a text pixel is not meant to limit the pixel to include text. Rather classification as a text pixel shall be understood to include pixels constituting text, line art, bar codes and/or other image elements having sharp edges and/or high contrast, Architecture of a Typical Access Environment In one exemplary embodiment, the image enhancement system includes a system processor potentially including multiple processing elements. The term processing element may refer to (1) a process running on a particular piece, or across particular pieces, of hardware, (2) a particular piece of hardware, or either (1) or (2) as the context allows. Each processing element may be supported via a standard general purpose processor such as an Intel-compatible processor platform preferably using at least one PENTIUM III or CELERON (Intel Corp., Santa Clara, Calif.) class processor; alternative processors such as UltraSPARC (Sun Microsystems, Palo Alto, Calif.) could be used in other embodiments. ARM and/or MIPS RISC processors could also be used in some embodiments.

Figure 3:
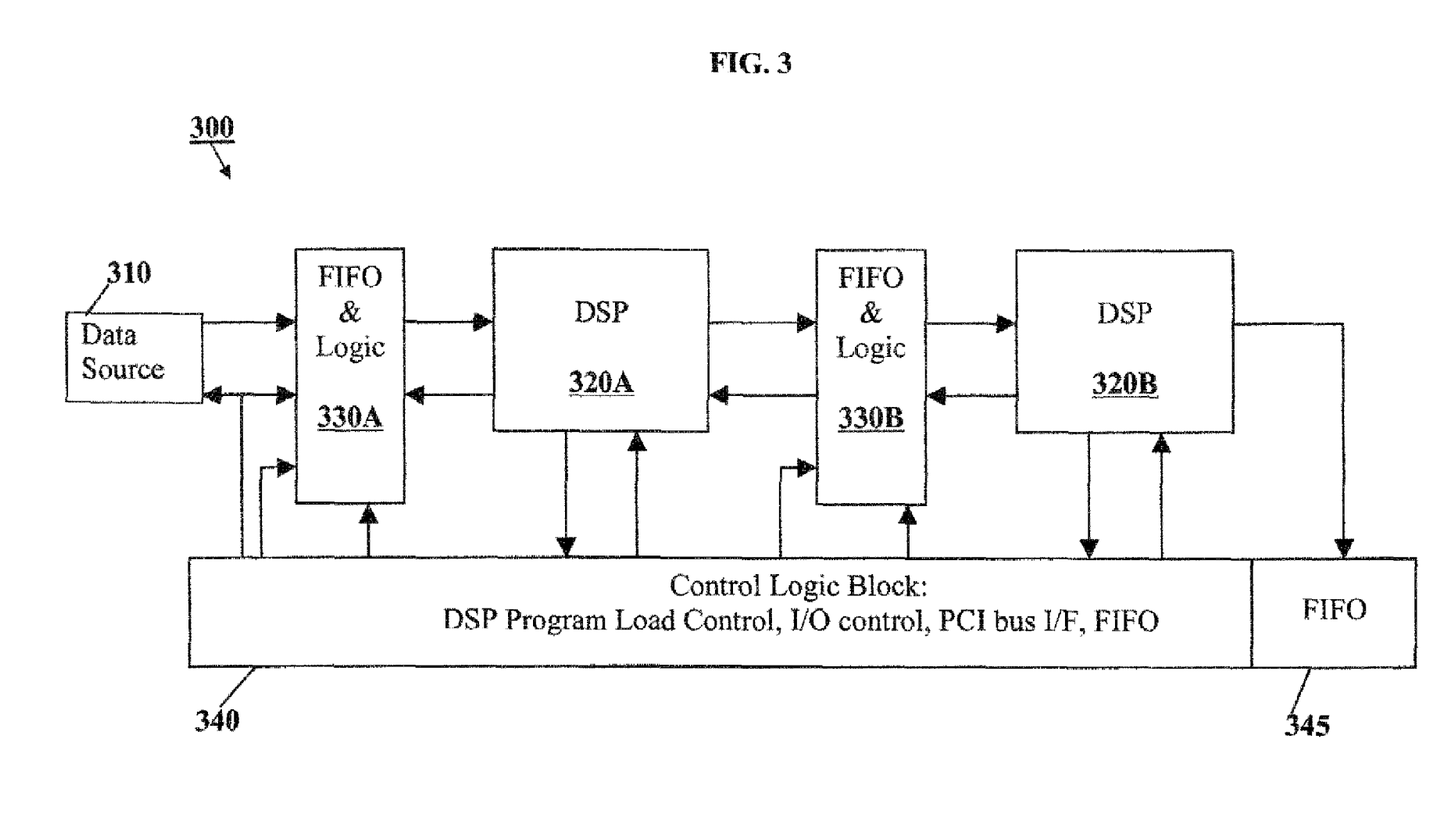
FIG. 3 is a logical block diagram of the components in a typical image-processing pipeline used in one embodiment of the present invention.

In addition, or instead, one or more special purpose processors such as digital signal processing (DSP) elements can be included. FIG. 3 is a block diagram depicting elements in one exemplary embodiment using DSP elements such as TI TMS320c62x or TMS320c64x DSPs (Texas Instruments, Dallas, Tex.). FIG. 3 illustrates an image-processing pipeline 300 incorporating several DSP elements 320A, 320B. Image data is received from an image data source 310. Various FIFO's (first-in-first-out queues) and associated logic 330A, 330B can be used to queue the data for forwarding to the DSP elements 320A, 320B. The pipeline includes a control logic block 340 for providing DSP program load control, input/output control, communication interfacing (e.g., PCI bus) and further queuing such as FIFO 345 handling output of the pipeline. The depicted image-processing pipeline can implement the various classification and/or enhancement methods according to the present invention.

Figure 1:
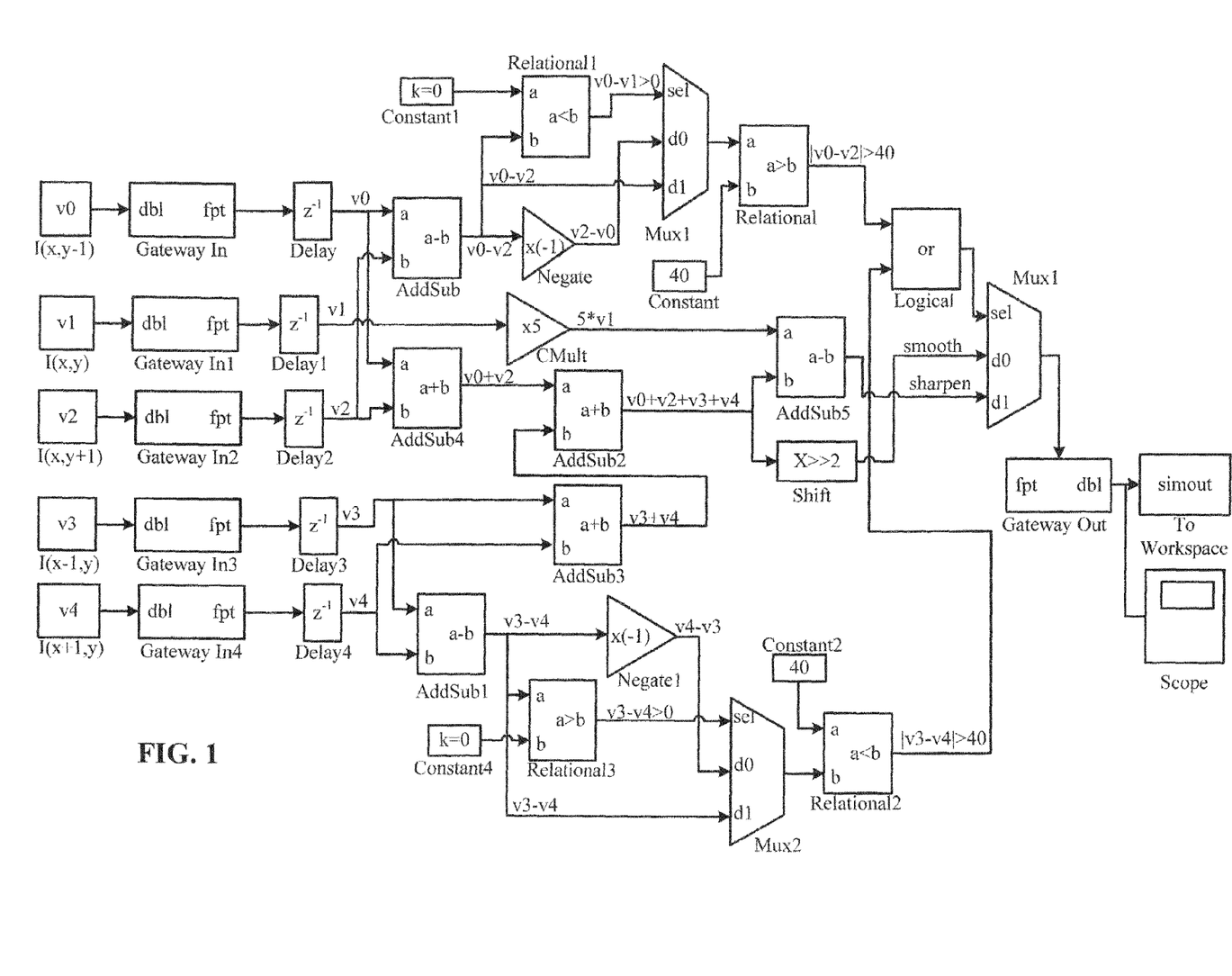
FIG. 1 depicts a hardware diagram of a system processor, or a processing element thereof, as used in one exemplary embodiment according to the present invention.
Figure 2:
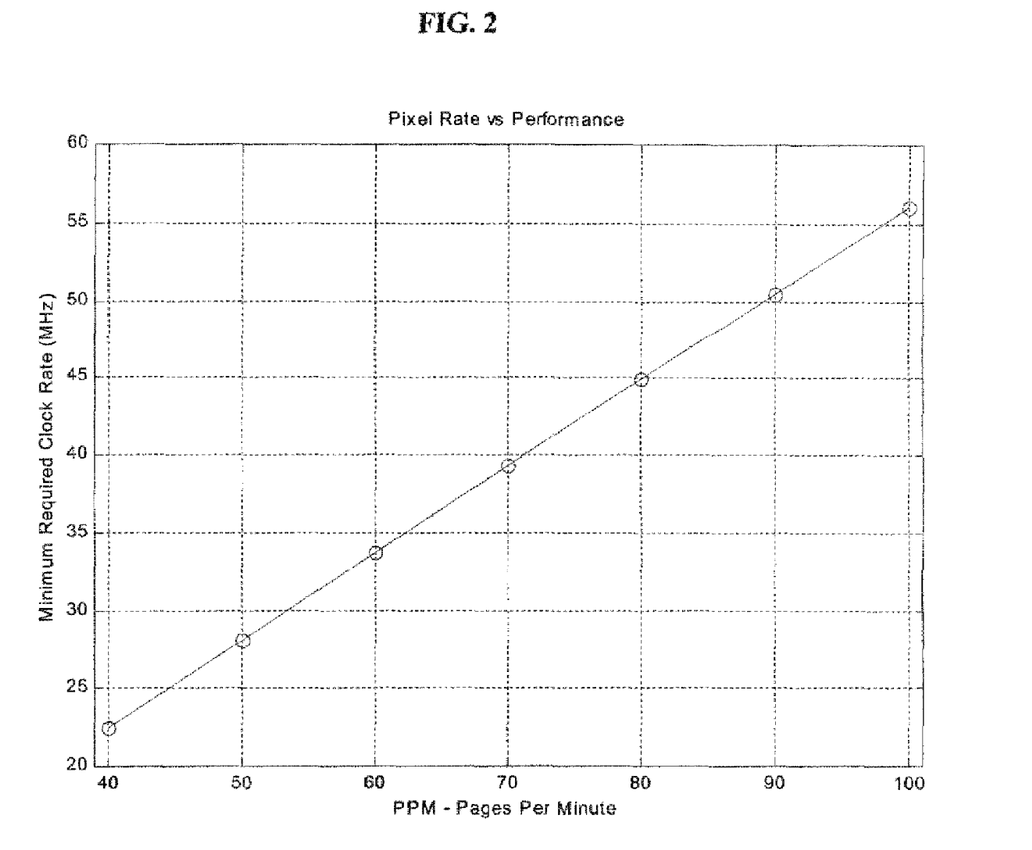
FIG. 2 is a graph illustrating the required throughput in MHz for a given printer performance in PPM.

In one exemplary embodiment, the system processor may include one or more field programmable gate arrays (FPGAs) configured to perform at least a portion of the enhancement functionality according to the present invention; FIG. 1 depicts a particular implementation of one such FPGA. The depicted implementation requires approximately 17,000 gates for moderate performance and fits in the smallest Xilinx Virtex XCV50-200 MHZz FPGA part. Even if the FPGA requires slow clocking of 35 MHz, it would have the capability to support a fast 60 pages-per-minute (PPM) printer. The graph illustrated in FIG. 2 depicts the required throughput in MHz for a given printer performance in PPM.

The system processor may also include one or more application specific integrated circuits (ASICs); in one exemplary embodiment, the ASIC could be designed in accordance with the FPGA design seen in FIG. 1. In some embodiments, the system processor may include a combination of general purpose processors, ASICs and/or FPGAs. In some embodiments, image enhancement functionality, as further described below, may be distributed across multiple processing elements. Some embodiments include an SDS that could include a variety of primary and secondary storage elements. In one exemplary embodiment, the SDS would include RAM as part of the primary storage; the amount of RAM might range from 8 MB to 2 GB in embodiments including a computer workstation, whereas a printer embodiment typically only uses from 512 KB to 32 MB. The primary storage may in some embodiments include other forms of memory such as cache memory, registers, non-volatile memory (e.g., FLASH, ROM, EPROM, etc.), etc. In some exemplary embodiments, the SDS can include an extremely small amount of primary memory sufficient for storing only a limited number of scan lines.

The SDS may also include secondary storage including single, multiple and/or varied servers and storage elements, For example, the SDS may use internal storage devices connected to the system processor. In embodiments where a single processing element supports all of the classification and image processing functionality, a local hard disk drive may serve as the secondary storage of the SDS, and a disk operating system executing on such a single processing element may act as a data server receiving and servicing data requests.

It will be understood by those skilled in the art that the different information used in the image classification, image processing and/or image enhancement processes and systems according to the present invention may be logically or physically segregated within a single device serving as secondary storage for the SDS; multiple related data stores accessible through a unified management system, which together serve as the SDS; or multiple independent data stores individually accessible through disparate management systems, which may in some embodiments be collectively viewed as the SDS. The various storage elements that comprise the physical architecture of the SDS may be centrally located, or distributed across a variety of diverse locations.

The architecture of the secondary storage of the system data store may vary significantly in different embodiments. In several embodiments, database(s) are used to store and manipulate the data; in some such embodiments, one or more relational database management systems, such as DB2 (IBM, White Plains, N.Y.), SQL Server (Microsoft, Redmond, Wash.), ACCESS (Microsoft, Redmond, Wash.), ORACLE 8i (Oracle Corp., Redwood Shores, Calif.), Ingres (Computer Associates, Islandia, N.Y.), MySQL (MySQL AB, Sweden) or Adaptive Server Enterprise (Sybase Inc., Emeryville, Calif.), may be used in connection with a variety of storage devices/file servers that may include one or more standard magnetic and/or optical disk drives using any appropriate interface including, without limitation, IDE and SCSI. In some embodiments, a tape library such as Exabyte X80 (Exabyte Corporation, Boulder, Colo.), a storage attached network (SAN) solution such as available from (EMC, Inc., Hopkinton, Mass.), a network attached storage (NAS) solution such as a NetApp Filer 740 (Network Appliances, Sunnyvale, Calif.), or combinations thereof may be used. In other embodiments, the data store may use database systems with other architectures such as object-oriented, spatial, object-relational or hierarchical.

Instead of, or in addition to, those organization approaches discussed above, certain embodiments may use other storage implementations such as hash tables or flat files or combinations of such architectures. Such alterative approaches may use data servers other than database management systems such as a hash table look-up server, procedure and/or process and/or a flat file retrieval server, procedure and/or process. Further, the SDS may use a combination of any of such approaches in organizing its secondary storage architecture.

Some embodiments can also include an imaging component for scanning a document. The imaging component can be of any suitable type known to those skilled in the art. Such imaging components can be found in any commercially available scanner, copier or facsimile machine. The imaging component can be integrated and housed together with the remaining components of a system according to the present invention. In other embodiments, the imaging component can be housed separately such as in a separate scanner, copier or facsimile machine and feed image data to remaining components of the document image classification and/or enhancement system.

Various methods and functions as exhibited in various embodiments according to the present invention are described below with respect to image classification and/or enhancement. In some embodiments, one or more processing elements within architectures of the environments as described above may execute the steps in such methods and provide such functionality. The functionality may spread across multiple processing elements. In other embodiments, any suitable computer readable storage device, media or combination of devices and/or media, including primary storage such as RAM, ROM, cache memory, etc. or secondary storage such as magnetic media including fixed and removable disks and tapes; optical media including fixed and removable disks whether read-only or read-write; paper media including punch cards and paper tape; or other secondary storage as would be known to those skilled in the art, may store instruction that upon execution by one or more processors cause the one or more processors to execute the steps in such methods and to provide such functionality.

Content-based Image Classification and Enhancement

Figure 4:
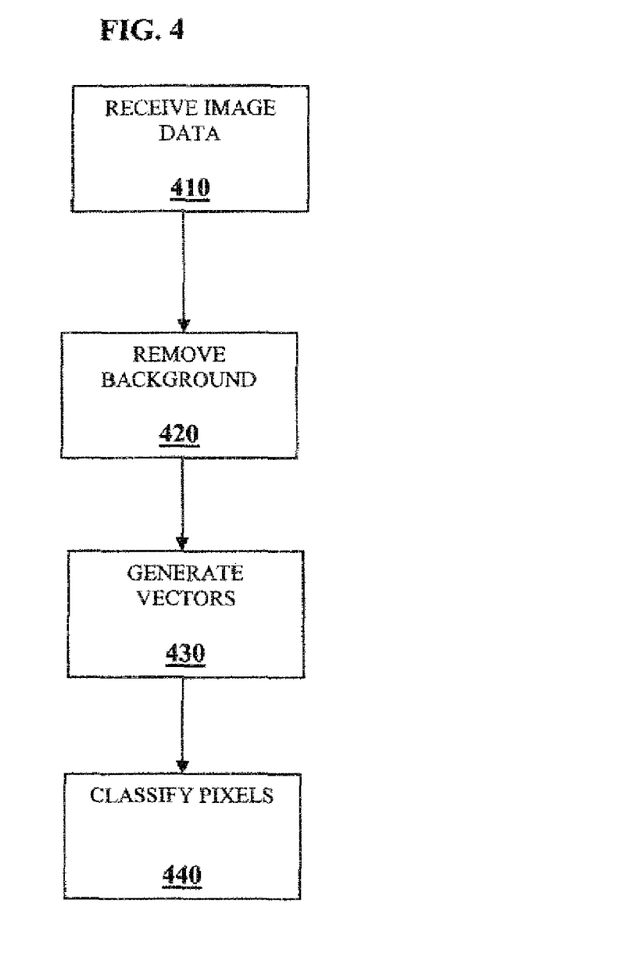
FIG. 4 is a flow chart of one typical classification process according to the present invention.

In one exemplary embodiment of the present invention, image data is classified. FIG. 4 is a flow chart depicting such a classification process. In step 410, image data is received. Image data can be received from any suitable internal or external source. The received image data can, in some embodiments, result from the scanning of a source document. In other instances, image data can be received from a prior process or from a prior step of a process encompassing the processes according to an embodiment the present invention. As used herein, receipt of the image data shall include internal generation of the image data.

The image data includes one or more pixels where each pixel has an associated pixel value. The pixel value can, in some embodiments, consist of multiple component values. Typically, the pixel value represents an intensity value directly, or the intensity value can be derived or selected from the component values of the pixel value. In some embodiments, the pixel value is, or can include, a gray value representing the intensity of a pixel in the gray scale associated with the image. The received image data can be stored in some embodiments.

In some embodiments, a background suppression step 420 occurs as discussed in greater detail below. The use of background suppression can increase contrast and improve document image classification and/or enhancement.

Feature vectors are generated in step 430 for a subset of pixels in the image data. Typically, this subset is the improper subset including all pixels in the image data; however, some embodiments can allow processing of more limited regions of the image data. In some such embodiments, a user interface can be provided that allows a user to define a region of interest such as by allowing entry of numeric values defining the region or by allowing graphical definition via a suitable input device such as a mouse, tablet, pen interface or the like.

A feature vector is a set of one or more measurements that condenses the description of relevant properties of the image into a small, Euclidean feature space. Each measurement represents an attribute of the respective pixel associated with the feature vector. The number of necessary features depends on the complexity of the image. The components of the feature vector can include, in some embodiments, gray values, filtered gray values, texture measures, Markov random field features, fractal dimension measures, and gradient magnitudes and directions.

In one exemplary embodiment, each feature vector includes measurements obtained from directional edge measures. These measurements are a vertical edge parameter and/or a horizontal edge parameter. In one such embodiments, these parameters are calculated as follows:

Vertical Edge Parameter $$|I(x,y+1)-I(x,y-1)|$$

Horizontal Edge Parameter $$|I(x+1,y)-I(x-1,y)|$$

where I(x, y) is the pixel value at location (x, y), or a scalar value derived from the components of the pixel values in embodiments where the pixel value is not a scalar. In some embodiments, I(x, y) is the gray value of the pixel at location (x, y).

Next, a subset of the pixels for which feature vectors have been generated are classified as text or image pixels in step 440. The subset of pixels typically includes all pixels for which feature vectors have been generated but need not in all embodiments.

For each pixel to be classified, a magnitude of its associated feature vector is calculated. In one exemplary embodiment, the magnitude of each feature vector is calculated by calculating a norm η of each generated feature vector χ, wherein $$\eta = \sqrt{\sum_{i=1}^{d} x_i^2}$$

and wherein {$x_i$|i=1,2, . . . , d} are elements of χ. In other embodiments, the magnitude can be calculated in a number of alternative ways including, without limitation, (1) the mean square (omit the square root), (2) the mean absolute value (omit the square root, replace the squaring with the absolute value), (3), the Nth root of the mean Nth power, (4) the mean of the Nth power, and/or some combined approach.

An initial determination is then made as to whether to mark the pixel associated with each feature vector as a potential text element pixel or an image pixel by comparing the calculated magnitude with a selected threshold. A user can specify the threshold in some embodiments. In addition, or instead, the threshold can be calculated automatically with or without a capability for manual override.

In one such automated approach, the histogram of edge magnitudes across the image is generated, and then peaks within a certain range of the histogram (e.g., within a certain percentile portion of the distribution) are selected. The threshold can be selected based upon the chosen peak according to specified heuristics. In either case, a default threshold can be configured for use when no threshold is entered or insufficient data is available to calculate one.

If the initial determination is that the pixel is an image pixel, the pixel is marked as an image pixel. The term "mark" as used herein with reference to pixels shall refer to any suitable mechanism for associating a characteristic, attribute or value with one or more pixels. Such mechanism can include, without limitation, providing one or more attribute arrays corresponding to pixels and reviewing and/or setting array elements as appropriate, examining and/or flagging elements within a suitable structure representative of particular pixels, reviewing and/or altering bits in a status portion or separate status word associated with each pixel or pixel value, and evaluating and/or modifying a sign of a value associated with one or more pixels.

If the initial determination is that the pixel is a potential text pixel, a further refinement can occur based upon spatial distance between the current pixel and a previously determined text pixel (typically the most recent previously determined text pixel). For example, if the spatial distance between the current pixel and a pixel previously marked as a potential text element pixel is below a specified distance threshold, all pixels in between these two potential text element pixels are marked as text pixels, and if not, all pixels between these two potential text element pixels are marked as image pixels.

The classification of each classified pixel is output. This output can be stored in some embodiments. In addition to or instead of storage, the classification can be output to support display and/or further processing of the received image data.

Some embodiments can support a variety of processing based upon the classification. For example, a Hough transformation can be applied to one or more of the pixels classified as text. A descreening transformation (also referred to as inverse halftoning) can be applied to one or more of the pixels classified as image. A filter can be applied to one or more of the pixels where the filter to be applied is determined based upon the classification of the pixel. Some embodiments can use one or more such processes alone or in combination.

The output of the processing of pixel can be stored in some embodiments. In addition to or instead of storage, the processed pixels can be output for display and/or further processing. In some embodiments, the processed pixel data is used to overwrite the original pixel data from the received image data in storage and/or prior to output. In other embodiments, the processed pixel data can be stored and/or output in parallel to the pixel data in the originally received image data.

In one exemplary embodiment, a sharpening filter is applied to one or more pixels classified as text, and/or a smoothing filter is applied to one or more pixels classified as image. The coefficients for a sharpening or a smoothing filter can be either fixed or dynamically determined. A fixed coefficient sharpening filter as used in one particular embodiment is:

$$\begin{bmatrix} -1 & -1 & -1 \\ -1 & 9 & -1 \\ -1 & -1 & -1 \end{bmatrix}$$

A fixed coefficient smoothing filter as used in one particular embodiment is:

$$1/9 \begin{bmatrix} 1 & 1 & 1 \\ 1 & 1 & 1 \\ 1 & 1 & 1 \end{bmatrix}$$

In some embodiments employing filters with dynamically determined coefficients, the coefficients are generated based upon the received image data; in one such embodiment, the coefficients for a filter applied to a particular pixel are based upon the spatial distance between the particular pixel and the next and/or previous similarly marked pixel.

Background Suppression

Some embodiments of the present invention include or consist of removing the background associated with a source image, or some portion thereof. In some embodiments, only pixel data of pixels identified as background pixels are modified. In some embodiments, the pixel data of all pixels in the source image data, or portion thereof, are modified. In both instances, the pixel data of background pixels are modified to represent an intensity corresponding to a terminal intensity.

A terminal intensity as used herein refers to an intensity value representing one end of an intensity scale associated with the image. For instance in a gray scale image, the terminal intensity would be the value, or component values, corresponding to either white or black. Any arbitrary intensity value could be specified as the terminal intensity; however, intensity corresponding to white or black would typically be chosen. In an embodiment where all pixel data are modified, the intensity value of foreground pixels are mapped according to any suitable function into the range of intensity value supported by the intensity scale associated with the image.

Figure 5:
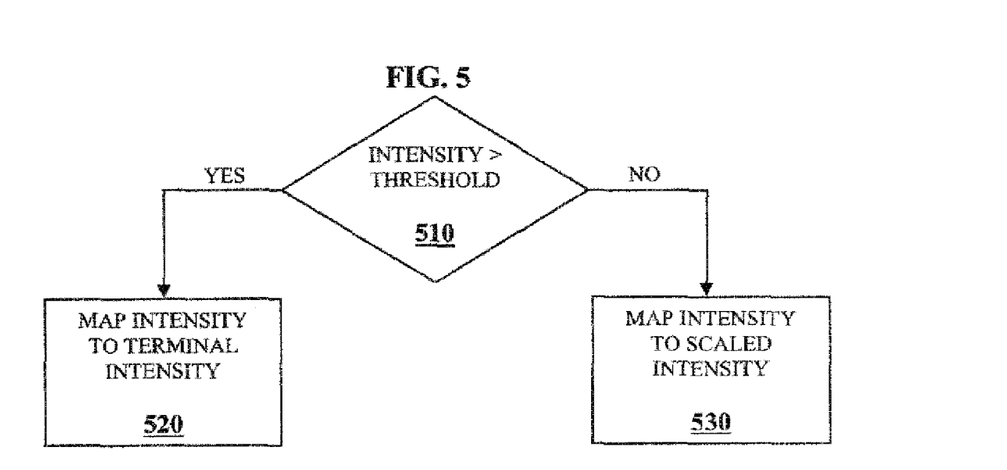
FIG. 5 is a flow chart of one background suppression process according to the present invention.

In some embodiments, a background removal process as depicted in FIG. 5 can be used. In step 510, an intensity value associated with each pixel is compared against an intensity threshold. The intensity value in some embodiments can be the pixel value associated with each pixel; in other embodiments, the intensity value can be derived from the pixel value, or the component values thereof. It should be noted that this step is not limited to the greater than comparison depicted in step 510; rather the comparison to the threshold could be upon any suitable basis including without limitation greater than or equal to, less than, less than or equal to or any other comparative function establishing whether a given pixel is foreground or background based upon established criteria. In step 510 as depicted, pixels with intensity above a threshold are considered background pixels.

Figure 6:
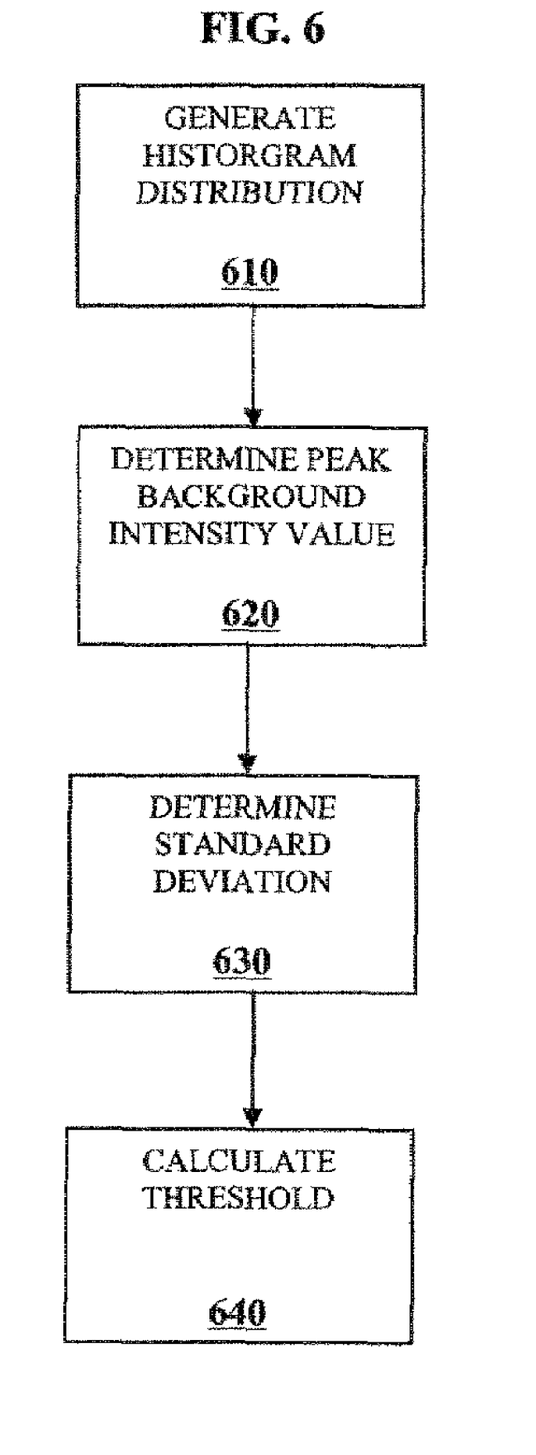
FIG. 6 is a flow chart of an approach that can be used to generate an intensity threshold for use in background suppression according to one embodiment of the present invention.

In various embodiments, the intensity threshold can be manually specified by a user, configured by default or dynamically calculated. FIG. 6 depicts a threshold calculation process tat can be used in some embodiments. In step 610, a histogram distribution of frequency of occurrence of intensity values from one or more scan lines of the image data is generated. In some such embodiment, ten scan lines can be used; however, other embodiments can use more or fewer scan lines. In step 620, a background peak intensity value is determined from the generated histogram. In one exemplary embodiment, the background peak intensity is determined by selecting the value of the lightest peak in the generated histogram. In some embodiments, this background peak intensity value can be the threshold.

In other embodiments, the threshold can be calculated as a function of this background peak intensity value. In some such embodiments, the function can use the standard deviation calculated from the histogram as part of the threshold calculation. As depicted in step 630, the standard deviation is determined from the generated histogram. The threshold can then be calculated in step 640. In some embodiments, the function used to generate the threshold can use the background peak intensity value less some function of the standard deviation (e.g., twice the standard deviation).

In step 520 of FIG. 5, the intensity of each pixel determined to be a background pixel is mapped to a terminal intensity. The pixel value of the pixel is modified, or components of the pixel value are modified, accordingly to represent the mapped terminal intensity. In step 530, the intensity of each pixel determined to be a foreground pixel is mapped to an intensity value of within the scale of intensities supported by the image using a suitable function. The pixel value of the pixel is modified, or components of the pixel value are modified, accordingly to represent the mapped intensity. In some embodiments, the function can be a linear mapping of the current intensity value into the full range of supported intensities. This can be implemented in some such embodiments by multiplying the current intensity by a value corresponding to a maximum intensity value and dividing by the intensity threshold.

In one particular embodiment used with eight bit gray scale images, a histogram generator generates a histogram distribution representing the frequency of occurrence of the gray values of the first ten scan lines. The histogram distribution is analyzed to determine a background peak gray value of the image, P, and a standard deviation, $\sigma$. A gray value threshold of $P-2\sigma$ is calculated. Each pixel in the image data, or portion thereof, is compared with the gray value threshold. If the gray value of the pixel is less than the gray value threshold, the value of the pixel is mapped linearly from 0 to 255; otherwise, the value of the pixel is mapped to 255 (corresponding to solid white, or to solid black in some embodiments).

Alternatively, any of a variety of background suppression techniques known to those skilled in the art may be used. Such techniques include those described in U.S. Pat. Nos. 5,157,740; 5,410,617; 5,699,454; 5,926,579; and 6,310,697. The contents of each of these patents are hereby incorporated herein by this reference.

Throughout this application, various publications may have been referenced. The disclosures of these publications in their entireties are hereby incorporated by reference into this application in order to more fully describe the state of the art to which this invention pertains.

The embodiments described above are given as illustrative examples only. It will be readily appreciated by those skilled in the art that many deviations may be made from the specific embodiments disclosed in this specification without departing from the invention. Accordingly, the scope of the invention is to be determined by the claims below rather than being limited to the specifically described embodiments above.

What is claimed is:

1. A method of processing a scanned image, comprising:
    receiving a plurality of pixels associated with the scanned image, each said pixel having one or more pixel values;
    sequentially processing said plurality of pixels, said processing of said plurality of pixels comprising:
        sequentially selecting a current pixel from said plurality of pixels, wherein said current pixel is a next sequential pixel in said plurality of pixels;
        calculating a feature vector for said current pixel;
        performing a comparison between said feature vector and a threshold;
        marking said current pixel as either an image pixel or a potential text pixel using said comparison between said feature vector and said threshold;
        further processing said potential text pixel by evaluating said sequentially selected pixels to determine if a prior potential text pixel was defined; and,
        marking all sequentially selected pixels between said prior potential text pixel and said potential text pixel as text pixels,
    wherein at least one of the receiving and the sequentially processing is performed by a processor.

2. A method of claim 1, further comprising:
    applying a smoothing filter to all said image pixels; and
    applying a sharpening filter to all said text pixels.

3. A method of claim 1, wherein said calculating said feature vector uses only pixels that are adjacent to said current pixel.

4. A method of claim 3, wherein said feature vector is comprised of a first absolute difference between an adjacent pixel above said current pixel and an adjacent pixel below said current pixel and a second absolute difference between an adjacent pixel to the left of said current pixel and an adjacent pixel to the right of said current pixel.

5. A method of claim 1, wherein said threshold is calculated from a histogram generated from said feature vectors from across the scanned image.

6. A method of claim 1, wherein said threshold is calculated from a histogram generated from said feature vectors from across a single line of the scanned image.

7. A method of claim 1, wherein said sequentially selecting a current pixel from said plurality of pixels selects said current pixel along a single scan line of the scanned image prior to advancing to the next said single scan line of the scanned image.

8. A method of claim 1, wherein said marking said current pixel as either an image pixel or a potential text pixel is completed for each said current pixel prior to marking the next said sequentially selected said current pixel.

9. A system for processing a scanned image, comprising:
- a means for receiving and storing a plurality of pixels describing the scanned image, each of said plurality of pixels having one or more pixel values;
- a means for calculating a feature vector associated with a current pixel sequentially selected from said plurality of pixels, whereby said feature vector describes a subset of pixels selected from said plurality of pixels;
- a means for comparing said feature vector to a threshold to categorize said current pixel as either an image pixel or a potential text pixel;
- a means for associating said potential text pixel with a prior potential text pixel identified from a prior current pixel, that was sequentially selected prior to said current pixel; and,
- a means for categorizing a group of said pixels from said prior potential text pixel to said potential text pixel as text pixels.

10. A system of claim 9, wherein said feature vector is comprised of a first absolute difference between an adjacent pixel above said current pixel and an adjacent pixel below said current pixel and a second absolute difference between an adjacent pixel to the left of said current pixel and an adjacent pixel to the right of said current pixel.

11. A system of claim 9, wherein said threshold is calculated from a histogram of said feature vectors across the scanned image.

12. A system of claim 9, wherein said threshold is calculated from a histogram of said feature vectors across a single scan line of the scanned image.

13. A system of claim 9, wherein said means for comparing said feature vector to said threshold is by calculating a norm of each said feature vector and comparing said norm to said threshold.

14. A system of claim 9, further comprising a means to sharpen said pixels categorized into said text pixel category and smooth said pixels categorized into said image pixel category.

15. A system of claim 9, wherein said means for associating said potential text pixel with a prior potential text pixel is a flag indicating a pixel location within said plurality of pixels and said pixel location identifies said prior potential text pixel.

* * * * *